United States Patent [19]

Bank et al.

[11] 3,902,748

[45] Sept. 2, 1975

[54] PNEUMATIC ENERGY ABSORBING BUMPER SYSTEM FOR MOTOR VEHICLES

[75] Inventors: Thomas A. Bank, Carmel, Ind.; Jack E. Gieck; David A. Weitzenhof, both of Akron, Ohio

[73] Assignee: The Firestone Tire & Rubber Company, Akron, Ohio

[22] Filed: Dec. 12, 1973

[21] Appl. No.: 426,615

[52] U.S. Cl. ................ 293/71 P; 267/116; 114/219
[51] Int. Cl. ............................................ B60r 19/10
[58] Field of Search ............ 267/116, 139; 114/219; 293/DIG. 1, DIG. 2, 60, 63, 71 R, 71 P, 98

[56] References Cited
UNITED STATES PATENTS

| | | | |
|---|---|---|---|
| 3,747,968 | 7/1973 | Hornsby | 293/88 |
| 3,768,850 | 10/1973 | Barton et al. | 293/71 P |
| 3,774,948 | 11/1973 | Gouirand | 293/71 P |
| 3,810,668 | 5/1974 | Kornhauser | 293/71 P |

*Primary Examiner*—Evon C. Blunk
*Assistant Examiner*—Robert Saifer

[57] ABSTRACT

Disclosed is a pneumatic energy absorbing bumper system for interposition between two objects at least one of which is movable including an inflatable elastomeric module means for receiving an external force, support means for mounting said module means to at least one of said objects, means for hermetically sealing the module means to the support means to form a cavity therebetween closed to the atmosphere, and means for permitting selective communication between the cavity and the atmosphere upon the application of an external force of predetermined magnitude to the module means.

7 Claims, 4 Drawing Figures

PNEUMATIC ENERGY ABSORBING BUMPER SYSTEM FOR MOTOR VEHICLES

BACKGROUND OF THE INVENTION

The present invention relates to energy absorbing bumpers specifically, a light weight bumper presenting a soft collision interface to objects on impact, and having a relatively wide, effective angle of collision acceptance. Although various fluids may be employed in such bumpers, the utilization of air as the working fluid not only produces a lighter weight assembly, but also obviates the need for seasonal maintenance which is necessary in some climates with liquids.

Recent Department of Transportation (DOT) requirements have stimulated development of a suitable energy absorbing bumper system for motor vehicles. Although pneumatic energy absorbing bumper designs have been known since 1898, when they were first utilized with railway carriages, many of the present design proposals do not differ appreciably from the early configurations.

To applicants knowledge most pneumatic bumper systems proposed or existing to date are subject to one or more of several disadvantageous limitations. Many operate at relatively low or even zero static pressures, thereby greatly limiting their energy absorbing capacity. Further, inasmuch as such systems contain no energy dissipating valving, they function primarily as energy storing devices rather than energy dissipating systems and as such tend to act as a spring imparting a potentially harmful rebound effect immediately following impact with another object. And, aside from whether or not the bumper performs acceptably, aesthetic and economic factors are also deemed significant. At present, existing flexible pneumatic bumpers tend to have an unattractive balloon shape when properly inflated and the cost, particularly in labor, to manufacture a suitable pneumatic bumper, having a significant structure to withstand substantial air pressure and yet remain aesthetically pleasing, has been nearly prohibitive. Because of the limitations of the materials of which they were made, previous pneumatic bumpers were limited to static pressures of less than 10 lbs. per square inch, thus limiting their energy absorbing capacity. To withstand the pressures requisite to high energy absorbing capacity systems would require fabrication from multiple plies of reinforcing fabrics laminated to elastomeric materials, a construction similar to that used in the manufacture of tires, air springs for vehicle suspensions and pneumatic dunnage cushions. Such a bumper must first be built from uncured elastomeric stock upon a suitable form and then cured in the desired shape. Because the building step is necessarily tedious and costly, the majority of existing pneumatic bumpers have not possessed adequate structure to absorb a maximum amount of energy. Indeed, many function only as an inflated pillow, cushioning an object upon impact followed by undesirable rebounding due to the compressed air therein.

One relatively recent design involving a pneumatic bumper is a type of closed system and includes an inflatable bumper portion which is vented directly to a storage tank through suitable conduits. Prior to impact, pressures within the bumper and the tank are at equilibrium and immediately following impact, most of the working fluid is driven from the bumper to the tank with an increase in pressure therein. The fluid subsequently bleeds back into the bumper until equilibrium again obtains.

Generally, pneumatic bumpers absorb energy as they are compressed. Bumpers which are entirely closed offer increased resistance to compression, as they are subjected to increased forces of impact or peak loads, inasmuch as the latent air therein must actually expand the flexible structure. For this reason, static pressure within the bumper cannot be too high or the structure may rupture on impact. Alternately, if the structure does not rupture, its lack of compression may permit damage to occur since the forces of impact will be transferred to both the impacted and the impacting object.

A pneumatic bumper which vents its air to another closed system such as a tank may be considered an improvement over the totally closed structure in some respects; however, certain problems with the former system are merely lessened and not eliminated. For example, upon compression of the flexible bumper, air is driven therefrom, but as more of that air is transferred to the tank and the pressure increases therein, the bumper itself resists further compression thereby limiting its capacity to absorb energy. Nor, can relatively higher static pressures be maintained in the bumper to tank system, inasmuch as both pressures must be at equilibrium prior to impact. If the air pressure within the bumper and tank are both relatively high in this context, e.g., greater than 10 psig, transfer of the air from the bumper to the tank becomes more difficult. Furthermore, the tank itself must be strong enough to resist rupturing, adding even more weight to the vehicle. Increased bumper weight, particularly when it is in the front bumper which necessarily is located forward of the front axle of a vehicle contributes to problems such as increased tire wear and sluggish steering response.

Therefore, because pneumatic bumpers of either the above types inherently absorb energy during compression, the problem has been that to obtain a maximum degree of compression, the impacting or peak loading force to compress the bumper is often so high that harmful forces are transferred during collision rather than absorbed because the bumper cannot be compressed fully.

SUMMARY OF THE INVENTION

It is therefore an object of the present invention to provide a pneumatic bumper system which is capable of withstanding higher pressures of inflation, e.g., greater than 10 psi.

It is another object of the present invention to provide a pneumatic bumper system which is readily compressed to a maximum degree to a lower peak loading force than existing pneumatic systems.

It is still another object of the present invention to provide a pneumatic bumper system which is relatively light in weight and utilizes air or other suitable gas as the working fluid.

It is another object of the present invention to provide a pneumatic bumper system having a soft collision interface surface and having a wide, effective angle of collision acceptance.

It is yet another object of the present invention to provide a pneumatic bumper system which absorbs energy of impact and dissipates a higher percentage of that energy than existing bumper systems.

It is another object of the present invention to provide a pneumatic bumper system which removes the energy of collision from the system by dissipating it to the atmosphere in a harmless form.

It is still another object of the present invention to provide a pneumatic bumper system consisting of an elastomeric material which does not require internal reinforcement fabrics therein.

It is a still further object of the present invention to provide a pneumatic bumper system which can be readily and/or automatically re-inflated for subsequent collisions following initial impact.

It is yet another object of the present invention to provide a pneumatic bumper system which does not tend to assume an unattractive shape upon inflation, and which can be repeatedly impacted at below design speeds without damage to the motor vehicle or to the system itself.

It is another object of the present invention to provide a pneumatic bumper system which can be interposed between a fixed object and a variety of vehicles and other objects.

These and other objects of the present invention, together with the advantages thereof over existing and prior art forms, which will become apparent from the following specification are accomplished by means hereinafter described and claimed.

In general the pneumatic energy absorbing bumper system of the present invention may be interposed between two objects at least one of which is movable includes an inflatable elastomeric module means for receiving an external force, support means for mounting said module means to at least one of said objects, means for hermetically sealing the module means to the support means to form a cavity therebetween closed to the atmosphere, and means for permitting selective communication between the cavity and the atmosphere upon the application of an external force of predetermined magnitude to the module means.

BRIEF DESCRIPTION OF THE DRAWINGS

FIG. 1A is a top plan view depicting the right half of a pneumatic bumper according to the preferred form of the invention;

DESCRIPTION OF THE PREFERRED EMBODIMENT

Figure 1:
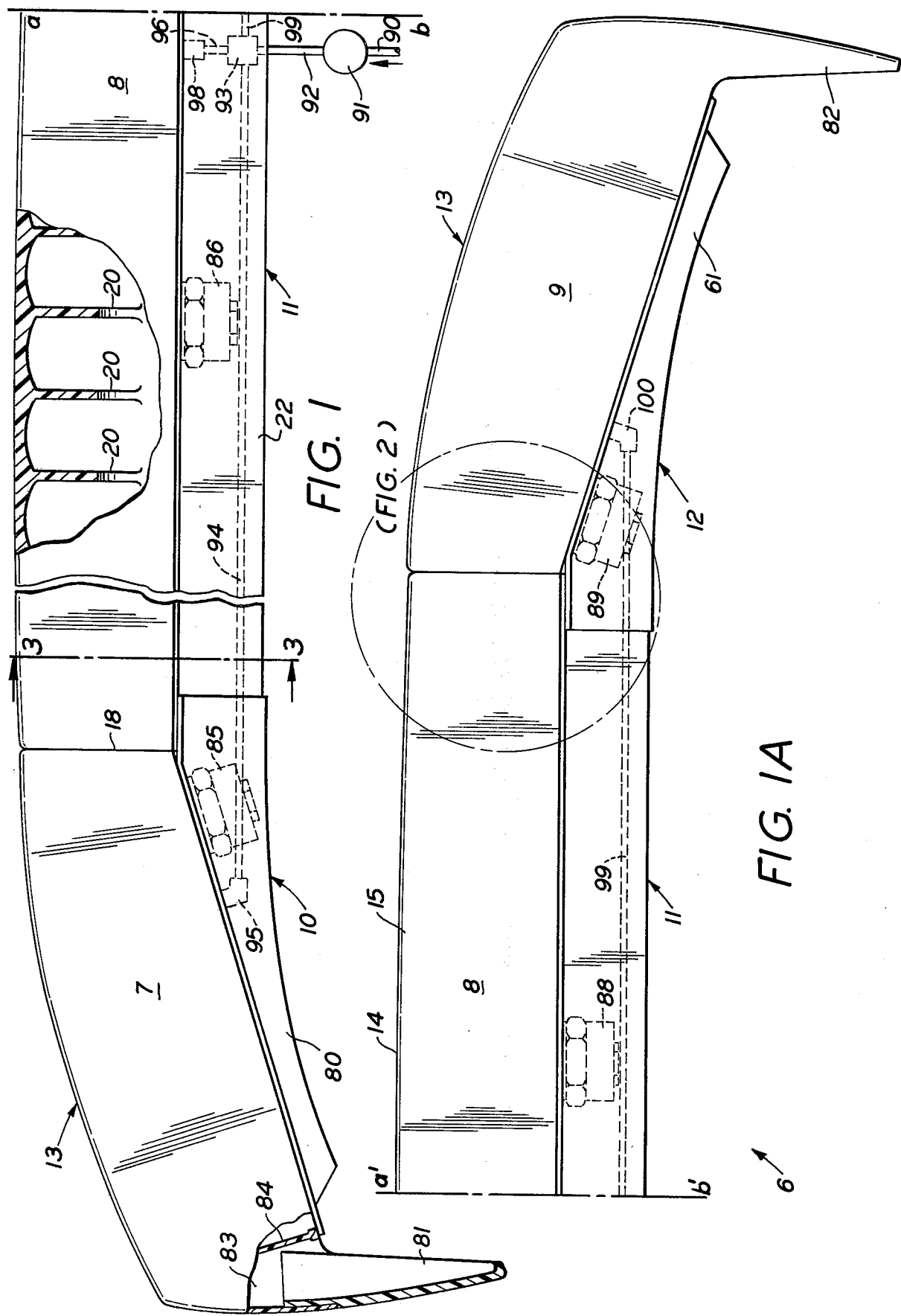
FIG. 1 is a top plan view partially broken away depicting the left half of a pneumatic bumper according to the preferred form of the invention.

The pneumatic energy absorbing bumper system, referred to generally by the numeral 6, and depicted in FIGS. 1–1A, includes three elastomeric bumper modules, a left side section 7, a center section 8, and a right side section 9. The preferred elastomeric material for the modules 7–9 is a special type of polyurethane described in a related copending patent application, U.S. patent application Ser. No. 368,155, filed by our common assignee The Firestone Tire and Rubber Company, on June 8, 1973 and now abandoned, to which reference is made for such additional information on the material as may be required to practice the invention otherwise disclosed and described herein. The elastomeric material therein described has a high modulus on the order of 10 to 20 times that of conventional elastomers and twice the tensile strength thereof, yet without sacrifice of elongation properties. The material is readily cast, according to known techniques, into the desired shape of the modules and requires no reinforcement fabric incorporated therein.

Each of the modules 7–9 is generally rectangularly shaped and forms a separate hermetically sealed cavity with supporting structure referred to generally by numerals 10, 11 and 12 respectively, as described below. In the particular embodiment described herein, the three modules 7–9 form a continuous curved impacting interface, generally referred to by the numeral 13. Although differing somewhat in appearance and size, the modules 7–9 are functionally designed so as to be identical and therefore, individual structural components of each will not be repeated. The overall appearance of the bumper system 6 as well as the use of three modules 7–9 is not intended to limit the scope of the invention, it being understood that the number of modules employed and their appearance is a mere matter of choice dictated primarily by the size and type of motor vehicle upon which it is mounted. As regards the motor vehicles, the bumper system 6 can actually be mounted on any vehicle such as buses, trucks, trailers, passenger cars and the like. Moreover, the bumper system 6 could readily be mounted on a boat or even on a stationary object such as a loading dock to effect collision protection and therefore, broadly, may be employed wherever conventional bumpers are currently utilized.

Referring again to the drawings, the center module 8 may be considered typical of the modules 7–9. The center module includes a front wall 14, an upper or top wall 15, a lower or bottom wall 16 (FIG. 3), a right side wall 17 (FIG. 2) and a left side wall referred to as at 18 but not visible. As depicted in the drawings, the top and bottom walls 15 and 16 terminate in a bead 19 as do the left and right side walls 17 and 18, the bead 19 being continuous about the rear perimeter of the module 8. A plurality of reinforcing ribs 20 connect the inner surfaces of the front, upper and lower walls 14, 15 and 16, forming many interconnected compartments within the module 8. The ribs 20 function primarily to maintain the walls 14, 15 and 16 flat when the module 8 is subsequently inflated as described below. The ribs 20 also contribute strength to the module 8 absorbing some of the force received upon impact.

The center supporting structure 11 includes a module closure plate 21, upon which the center module 8 is mounted, and a backup structure 22 which provides structural integrity and transmits the forces of collision to the object or vehicle upon which it is mounted. The backup structure 22 also provides a suitable location for mounting brackets such as 23. Although the supporting structure 11 includes two elements, the closure plate 21 and the backup structure 22, it is entirely possible that both said elements could be combined as one integral structure, or even for the object or vehicle to be provided with the equivalent of the backup structure 22 and closure plate 21 permitting the module 8 to be mounted directly thereon.

The uppermost end 24 closure of plate 21 extends into a recess 25 formed in the inner side of wall 15 preferably adjacent the bead 19. Similarly, the lowermost end 26 of plate 21 extends into a recess 27 formed in the inner side of wall 16 also preferably adjacent the bead 19. An upper bead clamp 28 engages the rear and upper edges of the bead 19 and has a downwardly extending lip 29 which is received in a second recess 30 in the wall 15 opposite the recess 25. The foot 31 of bead clamp 28 reposes against a rearwardly extending flange 32 carried by the closure plate 21. The bead clamp 28 is firmly fastened to the flange 32 as with nuts and bolts such as at 33 (FIG. 2) at suitable intervals along the length of upper wall 15. The nuts 33 also pass through the backup structure 22 securing it to the flange 32.

Similarly, at the lower wall 16, a lower bead clamp 34 engages the rear and lower edges of the bead 19 and has an upwardly extending lip 35 which is received in a second recess 36 in the wall 16 opposite the recess 27. The foot 38 of bead clamp 4 reposes against a rearwardly extending flange 39 formed in the closure plate 21 and is firmly fastened thereto, as is the backup structure 22, by a plurality of nuts and bolts (not shown) at suitable intervals along the length of lower wall 16 in the same manner as previously described in conjunction with bead clamp 28. Upon tightening of the bolts the bead clamps 28 and 34 hermetically seal the upper and lower walls 15 and 16 of the module 8 to the closure plate 21.

The mounting bracket 23, when one is utilized, may be conveniently attached to the backup structure 22 with nuts and bolts 40, 41 and 42, 43. The bracket 23 may be directly attached to the object or vehicle or may itself be an integral part thereof. Moreover, on various objects and vehicles, the backup structure 22 could readily be mounted to other support members in a variety of ways.

Figure 2:
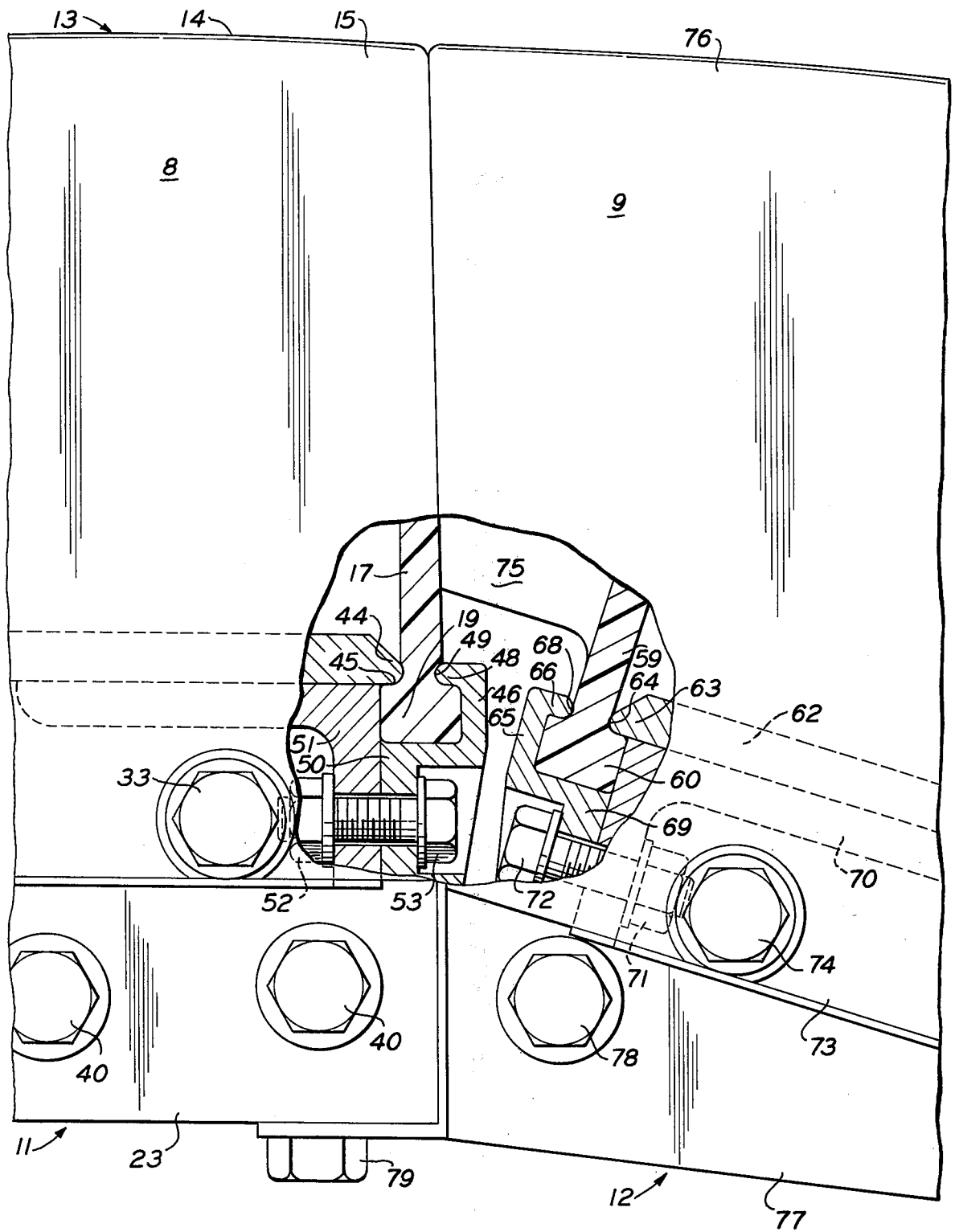
FIG. 2 is a modified enlarged view, partially in section, of the area within the chain line circle appearing in FIG. 1A; and, FIG. 3 is an enlarged cross section taken substantially along the line 3—3 in FIG. 1.

The bead 19 at the side walls 17 and 18 of module 8 is also mounted between the closure plate 21 and a bead clamp. Referring specifically to FIG. 2, the right end 44 of closure plate 21 extends into a recess 45 formed in the inner side of the wall 17 preferably adjacent the bead 19. A lateral bead clamp 46 engages the rear and side of bead 19 and has a laterally extending lip 48 which is received in a second recess 49 in the wall 17 opposite the recess 45. The foot 50 of bead clamp 46 abuts an angle support 51 which may extend from closure plate 21, as the flanges 32 and 39, or be separately fastened thereto in a suitable manner. Joining of bead clamp 46 to support 51 with a nut 52 and bolt 53 at suitable intervals along the length of side wall 17 hermetically seals the wall 17 to the closure plate 21. A similar sealing along the side wall 18 completely seals the air within the module 8 to the surrounding atmosphere.

The left and right modules 7 and 9 are hermetically sealed in an identical manner to the module 8 and also carry ribs such as 20 described in conjunction with module 8. In FIG. 2, a portion of that sealing arrangement is depicted for the right module 9 having a side wall 59 terminating in a bead 60. The supporting structure 12 includes a backup structure 61 (FIG. 1A) and a closure plate 62 having an end 63 which is received in a recess 64 on the inner side of the wall 59. Another lateral bead clamp 65 engages the rear and side of bead 60 and has a laterally extending lip 66 which is received in a second recess 68. The bead clamp foot 69 abuts an angle support 70, similar to the support 51 in module 8. A nut 71 and bolt 72 joins bead clamp 65 to the support 70 hermetically sealing the side wall 59 between clamp 65 and closure plate 62. The bead 60 is continuous about the rear of module 9 as is the bead 19 in module 8. The closure plate 62 is also fastened to other bead clamps such as 73 with bolts 74 to effect hermetic sealing of the module 9.

Also depicted in FIG. 2 is a substructure 75 extending laterally of the side wall 59 proximate the side wall 17 of center module 8. The substructure 75 permits the right module 9 to be angularly disposed from the center module 8 and yet maintain a continuous impacting interface 13. The upper wall 76 of module 9 is therefore continuous with the upper wall 15 of module 8 although the area between side walls 17 and 59 is not hermetically sealed, as shown. The lower wall (not shown) of module 9 is also continuous with the lower wall 16 of module 8.

Figure 3:
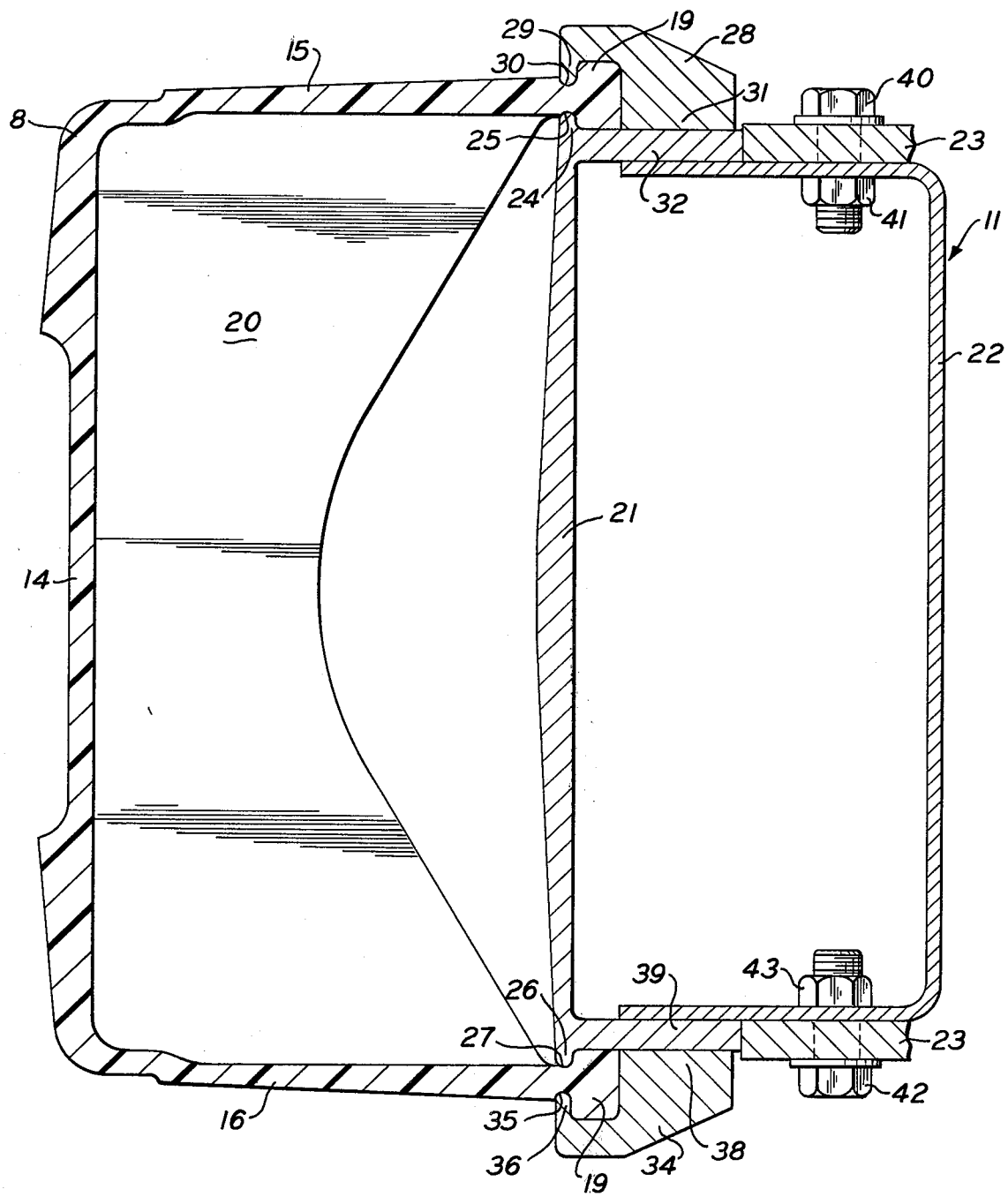

A mounting bracket 77 abuts the closure plate 62 and is fastened thereto with a bolt 78 passing through to the backup structure 61 (not shown) similar to the arrangement depicted in FIG. 3 between the flange 32 and bracket 23. The bracket 77 is joined to bracket 23 of module 8 as by a bolt 79 and permits the two modules 8 and 9 to be angularly disposed with respect to each other. Such angular disposition as between modules 7 to 8 and 8 to 9, depicted in FIGS. 1–1A, is also effected by the connection of backup structure 80 to backup structure 22 and of backup structure 61 to backup structure 22.

The left and right modules 7 and 9 also have rearwardly extending wings, 81 and 82, respectively, as depicted in FIGS. 1–1A. The structure of the left module wing 81 is detailed in FIG. 1 and it is there seen to be rearwardly extending from a substructure 83 adjacent inner wall 84. The inner wall 84 is hermetically sealed to a closure plate (not shown) as described in conjunction with module 8; however a substructure 83 is not pneumatic structure, as shown. The wing 81, which may be cemented to the substructure 83 functions to conceal the supporting structure 10 and to afford at least a modicum of protection to the vehicle from lateral scrapes and blows thereto. The wing 81 also acts as an anti-hooking cam surface lessening the change of the system 6 being caught on an object when the vehicle is backing up, and it protects brushes in automatic vehicle washing apparatus from being damaged.

Each of the modules in the bumper system 6 is designed to permit compression of the latent air sealed therein upon impact with another object to a predetermined pressure and then to release all or part of the air at a controlled rate with the next increment of pressure increase. To effect this release, the modules are designed to have pressure release valves, burst diaphragms, or similar devices. As depicted in FIGS. 1–1A, the module 7 has one release valve 85, the module 8, two release valves 86 and 88 and the module 9, one release valve 89. Each of the release valves in threadably engaged with the closure plate providing a direct communication between the air within the module and the atmosphere during pressure relief.

Air pressure within each of the modules 7–9 of the bumper system 6 is maintained slightly above atmospheric pressure by means of an on board supply system (not shown). Air from the supply passes through an air line 90 to a pressure regulator 91 the purpose of which is to feed only the necessary amount of air to the modules 7–9 to maintain a desired static pressure therein. A second air line 92 leads from the pressure regular 91 to a union 93 having multiple outlets for the supply of each module. An air line 94 extends from the union 93 to a suitable fitting 95 on the closure plate of the left module 7. Similarly, another air line 96 extends from the union 93 to a fitting 98 in the closure plate 21 of center module 8, while an air line 99 from the union 93, extends to a fitting 100 in the closure plate 62 of the right module 13. Although one regulator 91 will maintain uniform pressure within the modules 7–9, if greater pressure in one or more of the modules 7–9 is desired, a second regulator could be employed.

A preferred operation of the bumper system 6 is as follows. Each of the modules 7–9 is equally inflated to a desired pressure, e.g., 10–30 psig which is uniformly maintained by the regulator 91. Inasmuch as each of the modules 7–9 is hermetically sealed, the system 6 does not use any more air so long as the pressure valves 85, 86, 88 and 89 remain closed. During a collision, one or more of the modules 7–9 will be compressed anywhere from a fraction of an inch to several inches with a resultant increase in air pressure within the particular module or modules. Concurrent with the increase in pressure and compression of a module, is an absorption of energy. When the static pressure within a module has increased to the pressure rating of the release valve (e.g., 5 to about 15 psi above normal static module pressure) the respective release valve opens, releasing the air pressure and dissipating the stored energy. If the force of impact be great enough, the module may be compressed until its front wall and/or interval ribs contacts the closure plate in which case most of the latent air therein will have been expelled to the atmosphere via the release valve.

In an actual dynamic test, total compression of a module took place in approximately 50 milliseconds with subsequent recovery of the elastomeric structure within approximately 85 milliseconds. Immediately after impact, the regulator 91 may reinflate the particular module or modules to the predetermined pressure, for subsequent impact. The elastomeric structure of the module has been found to withstand impacting forces causing total compression without suffering any damages.

Existing bumper systems utilize a liquid working fluid such as water, or they are pneumatic, utilizing air or other compressible gas. Unlike the liquid systems which are relatively imcompressible and must vent pressure immediately and the closed air systems which do not vent to the atmosphere, the present system 6 provides a maximum of energy absorption by permitting initial compression of air within the module followed by the quick release of the pressure to dissipate the energy. It has been observed that venting too rapidly results in inadequate absorption while no venting may result in transfer of most of the impacting energy directly to the vehicle with a minimum of energy absorption and little or no dissipation. Table I below presents initial tests made utilizing two prototype modules, inflated to 30 psig and each having a pressure release valve which opened at 47 psig, mounted on an 18,000 pound passenger bus which was driven into a concrete barrier wall at various speeds.

TABLE I

| Velocity (mph) | Bumper Compression (inches) | Maximum Force Transmitted (lbs.) | Kinetic Energy Absorbed in Collision (ft.-lbs.) |
|---|---|---|---|
| 2.3 | 0.75 | 16,000 | 3,360 |
| 3.0 | 1.50 | 29,000 | 5,710 |
| 4.0 | 1.85 | 39,000 | 10,150 |
| 5.0 | 2.25 | 51,000 | 15,850 |

Upon analysis of the bumper modules and bus exterior no damage was observed. A slight bowing of a frame extension member was observed, however, it has since been found that this could be eliminated with a more suitable release valve having a lower differential relief pressure for example, on the order of 5 psi above static pressure. Also, with a more suitable release valve, the compression of the module could be increased. Similar tests were made with the same bus at 5 mph and a stationary 1973 passenger car and no damage to either vehicle or their bumpers was observed.

Although the bumper system 6 has been tested and utilized with a bus having an on board air supply, lacking on conventional passenger vehicles, such a system could readily be used therewith by providing the passenger car with an inexpensive electric or vacuum operated air compressor or by reliance on an air system which is not on board. Thus it should be evident that the disclosed pneumatic bumper system carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A pneumatic energy absorbing and dissipating bumper system for interposition between two objects at least one of which is movable comprising: an inflatable elastomeric module means having an impacting face, upper, lower and side walls terminating in a continuous bead, support means for mounting said module means on at least one of said objects including a closure plate upon which said module means is mounted and a backup structure carrying said closure plate, means for hermetically sealing said continuous bead to said closure plate to form a cavity therebetween closed to the atmosphere, means for permitting selective communication between said cavity and the atmosphere upon the application of an external force of predetermined magnitude to said module means and means for inflating said module means to a predetermined pressure, substantially bove ambient pressure prior to and subsequent to application of an external force thereto.

2. A pneumatic energy absorbing bumper system, as in claim 1, wherein said elastomeric module means has a plurality of internal reinforcing ribs connecting said impacting face and said upper and lower walls.

3. A pneumatic energy absorbing bumper system, as in claim 1, wherein said means for hermetically sealing said module means to said closure plate comprises: bead clamping means for engaging a portion of said module means opposite said closure plate and attached to said closure plate by fastening means.

4. A pneumatic energy absorbing bumper system, as in claim 1, wherein said means for permitting selective communication between said closed cavity and the atmosphere comprises: a pressure release valve in said closure plate and opening to the atmosphere upon an increase of pressure within said module means.

5. A pneumatic energy absorbing bumper system, as in claim 1, wherein said means for inflating said module means includes at least one pressure regulator connected to a suitable supply of air, and conduit means from said regulator to said closure plate whereby air under pressure is supplied to said module means.

6. A pneumatic energy absorbing bumper system, as in claim 1, wherein said predetermined pressure is approximately 10-30 psig.

7. A pneumatic energy absorbing bumper system, as in claim 1, further comprising: mounting means communicating with said support means for attaching said bumper system to a vehicle.

* * * * *